(12) United States Patent
Holt et al.

(10) Patent No.: US 8,090,821 B2
(45) Date of Patent: *Jan. 3, 2012

(54) REAL-TIME NOTIFICATION OF PRESENCE CHANGES

(75) Inventors: Scott C. Holt, Decatur, GA (US);
Robert A. Koch, Norcross, GA (US);
David Scott, Norcross, GA (US);
Navneet Patel, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/133,590

(22) Filed: Jun. 5, 2008

(65) Prior Publication Data

US 2008/0244026 A1 Oct. 2, 2008

Related U.S. Application Data

(63) Continuation of application No. 10/144,425, filed on May 13, 2002, now Pat. No. 7,395,329.

(51) Int. Cl.
*G06F 15/16* (2006.01)

(52) U.S. Cl. ........ 709/224; 709/206; 709/203; 709/227; 455/416; 455/414.3

(58) Field of Classification Search .......... 709/204–206, 709/224, 226, 227; 455/416, 414.3
See application file for complete search history.

(56) References Cited

U.S. PATENT DOCUMENTS

| | | | |
|---|---|---|---|
| 5,675,733 A | 10/1997 | Williams | |
| 5,720,771 A | 2/1998 | Snell | |
| 5,793,365 A | 8/1998 | Tang et al. | |
| 5,796,393 A | 8/1998 | MacNaughton et al. | |
| 5,812,639 A | 9/1998 | Bartholomew et al. | |
| 5,926,179 A | 7/1999 | Matsuda et al. | |
| 6,047,327 A | 4/2000 | Tso et al. | |
| 6,058,420 A | 5/2000 | Davies | |
| 6,108,709 A | 8/2000 | Shinomura et al. | |

(Continued)

FOREIGN PATENT DOCUMENTS

WO  WO 03/098449  11/2003

(Continued)

OTHER PUBLICATIONS

Nguyen; Non-Final Rejection mailed Dec. 31, 2009 for U.S. Appl. No. 11/524,668, filed Sep. 21, 2006.

(Continued)

*Primary Examiner* — Carl Colin
*Assistant Examiner* — Mohammad Siddiqi
(74) *Attorney, Agent, or Firm* — Thomas, Kayden, Horstemeyer & Risley, LLP

(57) ABSTRACT

Embodiments of the present invention provide a system and method for providing presence and availability status information of a first user to a second user. The system includes a presence availability server for storing presence and availability status information of the first user. The presence availability server is configured to detect a change in the presence and availability status of the first user. The presence availability server also informs a notification server of a change in the presence and availability status of the first user. The notification server sends a notification message to a communication device of the second user. The notification message contains current presence and availability status information of the first user. Other systems and methods are also provided.

20 Claims, 7 Drawing Sheets

U.S. PATENT DOCUMENTS

| | | | |
|---|---|---|---|
| 6,151,507 | A | 11/2000 | Laiho et al. |
| 6,219,045 | B1 | 4/2001 | Leahy et al. |
| 6,286,033 | B1 | 9/2001 | Kishinsky et al. |
| 6,301,609 | B1 | 10/2001 | Aravamudan et al. |
| 6,425,006 | B1 | 7/2002 | Chari et al. |
| 6,429,893 | B1 | 8/2002 | Xin |
| 6,466,261 | B1 | 10/2002 | Nakamura |
| 6,546,005 | B1 | 4/2003 | Berkley et al. |
| 6,553,416 | B1 | 4/2003 | Chari et al. |
| 6,584,494 | B1 | 6/2003 | Manabe et al. |
| 6,591,094 | B1 | 7/2003 | Bentley |
| 6,654,790 | B2 | 11/2003 | Ogle |
| 6,658,095 | B1 | 12/2003 | Yoakum et al. |
| 6,665,375 | B1 | 12/2003 | Forlenza |
| 6,668,169 | B2 | 12/2003 | Burgan et al. |
| 6,671,693 | B1 | 12/2003 | Marpe et al. |
| 6,727,811 | B1 | 4/2004 | Fendis |
| 6,731,308 | B1 | 5/2004 | Tang et al. |
| 6,757,365 | B1 | 6/2004 | Bogard |
| 6,757,722 | B2 | 6/2004 | Lonnfors et al. |
| 6,771,173 | B1 | 8/2004 | Clayton |
| 6,816,578 | B1 | 11/2004 | Kredo et al. |
| 6,879,677 | B2 | 4/2005 | Trandal |
| 6,944,555 | B2 | 9/2005 | Blackett et al. |
| 6,954,136 | B2 | 10/2005 | Sauer |
| 6,965,935 | B2 | 11/2005 | Diong |
| 6,968,052 | B2 * | 11/2005 | Wullert, II ............... 379/210.01 |
| 6,968,179 | B1 | 11/2005 | De Vries |
| 6,987,840 | B1 | 1/2006 | Bosik et al. |
| 6,993,327 | B2 | 1/2006 | Mathis |
| 7,015,806 | B2 | 3/2006 | Naidoo |
| 7,020,696 | B1 | 3/2006 | Perry et al. |
| 7,043,530 | B2 | 5/2006 | Isaacs et al. |
| 7,058,036 | B1 | 6/2006 | Yu et al. |
| 7,262,690 | B2 | 8/2007 | Heaton |
| 7,302,270 | B1 | 11/2007 | Day |
| 7,313,617 | B2 | 12/2007 | Malik et al. |
| 7,321,921 | B2 | 1/2008 | Malik |
| 7,324,826 | B2 | 1/2008 | Carey et al. |
| 7,353,455 | B2 | 4/2008 | Malik |
| 7,370,278 | B2 | 5/2008 | Malik |
| 7,392,306 | B1 | 6/2008 | Donner et al. |
| 7,395,329 | B1 * | 7/2008 | Holt et al. ..................... 709/224 |
| 7,401,158 | B2 | 7/2008 | Beauchamp et al. |
| 7,406,501 | B2 | 7/2008 | Szeto et al. |
| 7,472,187 | B2 | 12/2008 | Malik |
| 7,483,969 | B2 | 1/2009 | Chavda et al. |
| 7,561,041 | B2 | 7/2009 | Nguyen et al. |
| 7,624,172 | B1 | 11/2009 | Austin-Lane |
| 7,676,550 | B1 | 3/2010 | Jachner |
| 7,701,925 | B1 * | 4/2010 | Mason et al. ................. 370/352 |
| 7,956,739 | B2 | 6/2011 | Hong et al. |
| 2002/0026483 | A1 | 2/2002 | Isaacs |
| 2002/0032740 | A1 | 3/2002 | Stern et al. |
| 2002/0035605 | A1 | 3/2002 | McDowell et al. |
| 2002/0046299 | A1 | 4/2002 | Lefeber et al. |
| 2002/0160757 | A1 | 10/2002 | Shavit et al. |
| 2003/0018903 | A1 | 1/2003 | Greca et al. |
| 2003/0050986 | A1 | 3/2003 | Matthews et al. |
| 2003/0217098 | A1 | 11/2003 | Bobde |
| 2003/0218631 | A1 | 11/2003 | Malik |
| 2004/0003046 | A1 | 1/2004 | Grabelsky et al. |
| 2004/0044738 | A1 | 3/2004 | Ohno et al. |
| 2004/0085205 | A1 | 5/2004 | Yeh |
| 2004/0086093 | A1 | 5/2004 | Schranz |
| 2004/0153506 | A1 | 8/2004 | Ito et al. |
| 2004/0171396 | A1 | 9/2004 | Carey |
| 2004/0177118 | A1 | 9/2004 | Mason |
| 2004/0177134 | A1 | 9/2004 | Lonnfors et al. |
| 2004/0179038 | A1 | 9/2004 | Blattner |
| 2004/0179039 | A1 | 9/2004 | Blattner |
| 2004/0221224 | A1 | 11/2004 | Blattner |
| 2004/0267887 | A1 | 12/2004 | Berger et al. |
| 2005/0010644 | A1 | 1/2005 | Brown |
| 2005/0068167 | A1 | 3/2005 | Boyer et al. |
| 2005/0166154 | A1 | 7/2005 | Wilson |
| 2005/0210104 | A1 | 9/2005 | Torvinen |
| 2005/0216565 | A1 | 9/2005 | Ito et al. |
| 2005/0218206 | A1 | 10/2005 | Ohno et al. |
| 2005/0228895 | A1 | 10/2005 | Karunamurthy et al. |
| 2006/0004924 | A1 | 1/2006 | Trossen |
| 2006/0030264 | A1 | 2/2006 | Morris |
| 2006/0031772 | A1 | 2/2006 | Valeski |
| 2006/0167998 | A1 | 7/2006 | Yoshiuchi et al. |
| 2006/0242239 | A1 | 10/2006 | Morishima et al. |
| 2006/0248184 | A1 | 11/2006 | We et al. |
| 2006/0252444 | A1 | 11/2006 | Ozugur |
| 2006/0253593 | A1 | 11/2006 | Jachner |
| 2006/0277296 | A1 | 12/2006 | Matsubara et al. |
| 2007/0016649 | A1 | 1/2007 | Nishiki |
| 2007/0083627 | A1 | 4/2007 | Mohammed et al. |
| 2007/0121867 | A1 | 5/2007 | Ozugur et al. |
| 2007/0124469 | A1 | 5/2007 | Mohammed et al. |
| 2007/0136475 | A1 | 6/2007 | Leppisaari et al. |
| 2007/0150825 | A1 | 6/2007 | Jachner |
| 2007/0182541 | A1 | 8/2007 | Harris et al. |
| 2007/0198725 | A1 | 8/2007 | Morris |
| 2007/0208702 | A1 | 9/2007 | Morris |
| 2007/0233854 | A1 | 10/2007 | Bukovec et al. |
| 2007/0265859 | A1 | 11/2007 | Jachner |
| 2008/0052384 | A1 | 2/2008 | Marl et al. |
| 2008/0077685 | A1 | 3/2008 | Nguyen |
| 2008/0184136 | A1 | 7/2008 | Malik |
| 2008/0209347 | A1 | 8/2008 | Malik |
| 2010/0219971 | A1 | 9/2010 | Appelman et al. |
| 2011/0029629 | A1 | 2/2011 | Burtner et al. |

FOREIGN PATENT DOCUMENTS

| | | |
|---|---|---|
| WO | WO 03/100637 | 12/2003 |

OTHER PUBLICATIONS

Nguyen; Non-Final Rejection mailed Jan. 22, 2010 for U.S. Appl. No. 11/525,008, filed Sep. 21, 2006.

Adamczyk; Advisory Action mailed Dec. 31, 2008 for U.S. Appl. No. 10/745,199, filed Dec. 23, 2003.

Nguyen; Notice of Allowance mailed Feb. 6, 2009 for U.S. Appl. No. 11/520,262, filed Sep. 13, 2006.

Nguyen; Non-Final Rejection mailed Mar. 9, 2009 for U.S. Appl. No. 11/524,668, filed Sep. 21, 2006.

Nguyen; Non-Final Rejection mailed Mar. 12, 2009 for U.S. Appl. No. 11/525,008, filed Sep. 21, 2006.

Malik; Non-Final Office Action mailed Apr. 8, 2010 for U.S. Appl. No. 12/059,320, filed Mar. 31, 2008.

Nguyen; Notice of Allowance mailed Apr. 6, 2009 for U.S. Appl. No. 11/520,262, filed Sep. 13, 2006.

Daigle; Final Office Action mailed Apr. 10, 2009 for U.S. Appl. No. 11/304,319, filed Dec. 15, 2005.

Adamczyk; Non-Final Rejection mailed Jun. 11, 2009 for U.S. Appl. No. 10/745,199, filed Dec. 23, 2003.

Nguyen; Final Office Action mailed Jun. 8, 2010 for U.S. Appl. No. 11/524,668 mailed Sep. 21, 2006.

Newton; Telecom Dictionary; Definition of "Ack"; CMP books, 20th edition, p. 42.

Holt; U.S. Appl. No. 10/144,425, filed May 10, 2002.

Malik; U.S. Appl. No. 10/223,859, filed Aug. 19, 2002.

Adamczyk; U.S. Appl. No. 10/745,199, filed Dec. 23, 2003.

Malik; U.S. Appl. No. 10/889,859, filed Jul. 13, 2004.

Malik; U.S. Appl. No. 10/985,361, filed Nov. 10, 2004.

Daigle; U.S. Appl. No. 11/304,319, filed Dec. 15, 2005.

Malik; U.S. Appl No. 12/017,999, filed Jan. 22, 2008.

Malik; U.S. Appl. No. 12/115,004, filed May 5, 2008.

Malik; U.S. Appl. No. 12/059,320, filed Mar. 31, 2008.

Holt; Non-Final Rejection mailed Aug. 25, 2005 for U.S. Appl. No. 10/144,425, filed May 13, 2002.

Holt; Final Rejection mailed Feb. 27, 2006 for U.S. Appl. No. 10/144,425, filed May 13, 2002.

Holt; Non-Final Rejection mailed Jul. 14, 2006 for U.S. Appl. No. 10/144,425, filed May 13, 2002.

Holt; Non-Final Rejection mailed Jan. 3, 2007 for U.S. Appl. No. 10/144,425, filed May 13, 2002.

Holt; Final Rejection mailed Jun. 19, 2007 for U.S. Appl. No. 10/144,425, filed May 13, 2002.

Holt; Notice of Allowance and Fees Due mailed Jan. 28, 2008 for U.S. Appl. No. 10/144,425, filed May 13, 2002.
Malik; Non-Final Rejection mailed Sep. 2, 2003 for U.S. Appl. No. 10/223,859, filed Aug. 19, 2002.
Malik; Examiner Interview Summary Record mailed Nov. 14, 2003 for U.S. Appl. No. 10/223,859, filed Aug. 19, 2002.
Malik; Final Rejection mailed Feb. 24, 2004 for U.S. Appl. No. 10/223,859, filed Aug. 19, 2002.
Malik; Examiner Interview Summary Record mailed Apr. 21, 2004 for U.S. Appl. No. 10/223,859, filed Aug. 19, 2002.
Malik; Advisory Action mailed Jun. 11, 2004 for U.S. Appl. No. 10/223,859, filed Aug. 19, 2002.
Malik; Non-Final Rejection mailed Oct. 20, 2004 for U.S. Appl. No. 10/223,859, filed Aug. 19, 2002.
Malik; Non-Final Rejection mailed May 18, 2005 for U.S. Appl. No. 10/223,859, filed Aug. 19, 2002.
Malik; Final Rejection mailed Nov. 21, 2005 for U.S. Appl. No. 10/223,859, filed Aug. 19, 2002.
Malik; Non-Final Rejection mailed Mar. 13, 2006 for U.S. Appl. No. 10/223,859, filed Aug. 19, 2002.
Malik; Final Rejection mailed Sep. 7, 2006 for U.S. Appl. No. 10/223,859, filed Aug. 19, 2002.
Malik; Pre-Brief Appeal Conference Decision mailed Mar. 15, 2007 for U.S. Appl. No. 10/223,859, filed Aug. 19, 2002.
Malik; Non-Final Rejection mailed Jun. 6, 2007 for U.S. Appl. No. 10/223,859, filed Aug. 19, 2002.
Malik; Notice of Allowance and Fees Due mailed Dec. 5, 2007 for U.S. Appl. No. 10/223,859, filed Aug. 19, 2002.
Adamczyk; Non-Final Rejection mailed Mar. 26, 2008 for U.S. Appl. No. 10/745,199, filed Dec. 23, 2003.
Malik; Non-Final Rejection mailed Nov. 4, 2005 for U.S. Appl. No. 10/889,859, filed Jul. 13, 2004.
Malik; Examiner Interview Summary Record mailed Jan. 4, 2006 for U.S. Appl. No. 10/889,859, filed Jul. 13, 2004.
Malik; Final Rejection mailed Mar. 28, 2006 for U.S. Appl. No. 10/889,859, filed Jul. 13, 2004.
Malik; Examiner Interview Summary Record mailed Jun. 5, 2006 for U.S. Appl. No. 10/889,859, filed Jul. 13, 2004.
Malik; Non-Final rejection mailed Jun. 27, 2006 for U.S. Appl. No. 10/889,859, filed Jul. 13, 2004.
Malik; Examiner Interview Summary Record mailed Aug. 2, 2006 for U.S. Appl. No. 10/889,859, filed Jul. 13, 2004.
Malik; Final Rejection mailed Dec. 12, 2006 for U.S. Appl. No. 10/889,859, filed Jul. 13, 2004.
Malik; Non-Final Rejection mailed Apr. 9, 2007 for U.S. Appl. No. 10/889,859, filed Jul. 13, 2004.
Malik; Examiner Interview Summary Record mailed Jun. 19, 2007 for U.S. Appl. No. 10/889,859, filed Jul. 13, 2004.
Malik; Examiner Interview Summary Record mailed Sep. 27, 2007 for U.S. Appl. No. 10/889,859, filed Jul. 13, 2004.
Malik; Notice of Allowance and Fees Due mailed Sep. 27, 2007 for U.S. Appl. No. 10/889,859, filed Jul. 13, 2004.
Malik; Non-Final Rejection mailed Jun. 5, 2006 for U.S. Appl. No. 10/985,361, filed Nov. 10, 2004.
Malik; Final Rejection mailed Dec. 5, 2006 for U.S. Appl. No. 10/985,361, filed Nov. 10, 2004.
Malik; Advisory Action mailed Feb. 28, 2007 for U.S. Appl. No. 10/985,361, filed Nov. 10, 2004.
Malik; Non-Final Rejection mailed Jun. 19, 2007 for U.S. Appl. No. 10/985,361, filed Nov. 10, 2004.
Malik; Notice of Allowance and Fees Due mailed Jan. 11, 2008 for U.S. Appl. No. 10/985,361, filed Nov. 10, 2004.
Daigle; Interview Summary mailed Jun. 15, 2009 for U.S. Appl. No. 11/304,319, filed Dec. 15, 2005.
Nguyen; Final Office Action mailed Jul. 16, 2010 for U.S. Appl. No. 11/525,008, filed Sep. 21, 2006.
Daigle; Non-Final Rejection mailed Jul. 29, 2009 for U.S. Appl. No. 11/304,341, filed Dec. 15, 2005.
Nguyen; Final Office Action mailed Sep. 3, 2009 for U.S. Appl. No. 11/524,668, filed Sep. 24, 2006.
Jensen; U.S. Patent Application having U.S. Appl. No. 12/535,062, filed Aug. 4, 2009.
Nguyen; Final Office Action mailed Sep. 15, 2009 for U.S. Appl. No. 11/525,008, filed Sep. 21, 2006.
Malik; Non-Final Rejection mailed Oct. 1, 2008 for U.S. Appl. No. 12/017,999, filed Jan. 22, 2008.
Adamczyk; Final Rejection mailed Oct. 14, 2008 for U.S. Appl. No. 10/745,199, filed Dec. 23, 2003.
Nguyen; Non-Final Rejection mailed Oct. 20, 2008 for U.S. Appl. No. 11/520,262, filed Sep. 13, 2006.
Daigle; Non-Final Rejection mailed Nov. 20, 2008 for U.S. Appl. No. 11/304,319, filed Dec. 15, 2005.
Adamczyk; Final Office Action mailed Dec. 8, 2009 for U.S. Appl. No. 10/745,199, filed Dec. 23, 2003.
Nguyen; Non-Final Office Action mailed Jan. 20, 2011 for U.S. Appl. No. 11/524,668, filed Sep. 21, 2006.
Nguyen; Non-Final Office Action mailed Feb. 2, 2011 for U.S. Appl. No. 11/525,008, filed Sep. 21, 2006.
Nguyen; Non-Final Office Action mailed Sep. 24, 2010 for U.S. Appl. No. 12/483,306, filed Jun. 12, 2009.
Malik; Final Office Action mailed Nov. 9, 2010 for U.S. Appl. No. 12/059,320, filed Mar. 31, 2008.
Nguyen; Notice of Allowance mailed Mar. 17, 2011 for U.S. Appl. No. 12/483,306, filed Jun. 12, 2009.
Malik; Non-Final Office Action mailed May 17, 2011 for U.S. Appl. No. 12/115,004, filed May 5, 2008.
Nguyen; Final Office Action mailed Jun. 29, 2011 for U.S. Appl. No. 11/524,668, filed Sep. 21, 2006.
Nguyen; Final Office Action mailed Jul. 6, 2011 for U.S. Appl. No. 11/525,008, filed Sep. 21, 2006.
Boyer, et al., "Presence Awareness Tools for Virtual Enterprise", 1998, 6 pages—Virtual Enterprise Workshop, Citeseer.

* cited by examiner

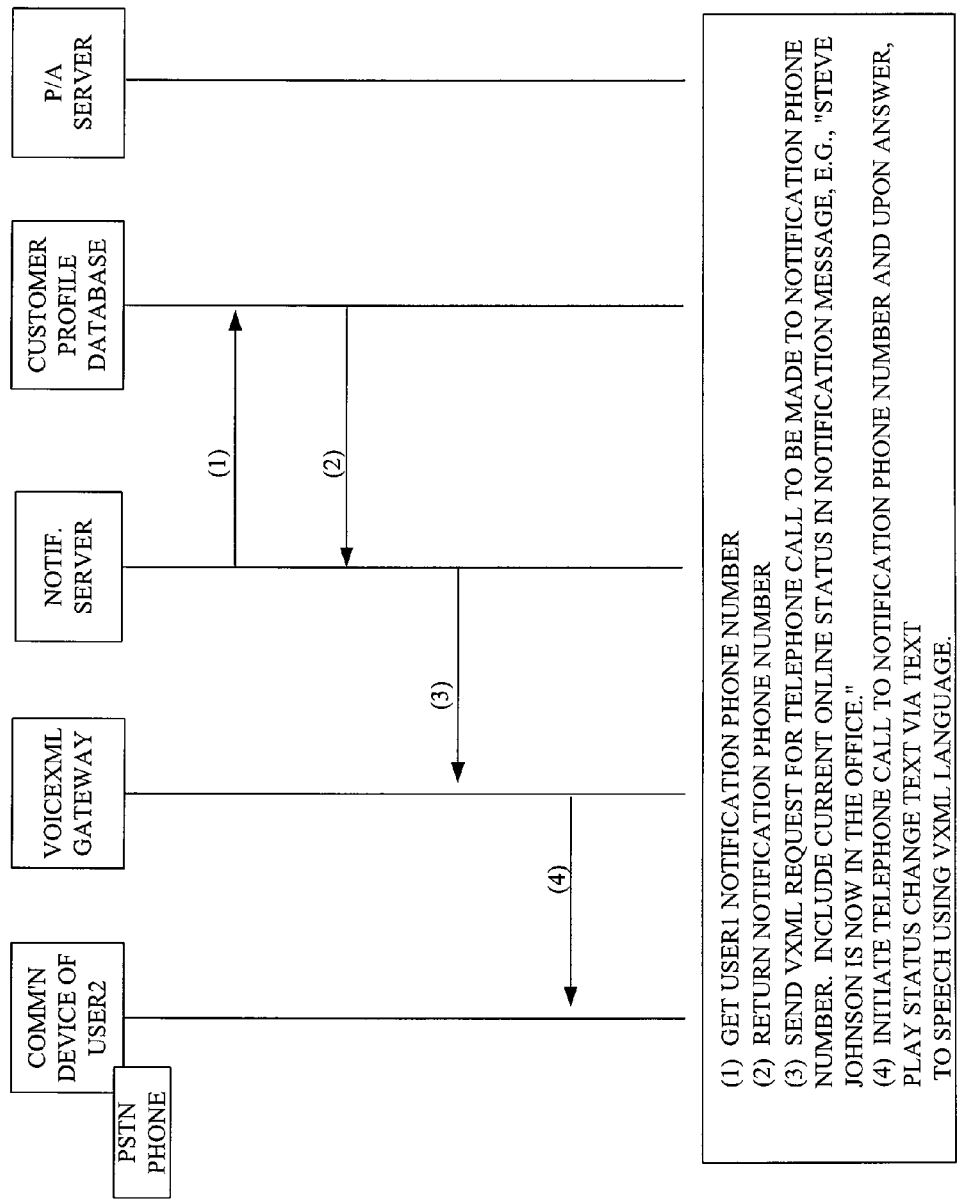

REAL-TIME NOTIFICATION OF PRESENCE CHANGES

CROSS-REFERENCE TO RELATED APPLICATION

This application is a continuation of U.S. utility application entitled, "Real-Time Notification of Presence Availability Changes," having Ser. No. 10/144,425, filed May 13, 2002, now issued as U.S. Pat. No. 7,395,329, which is entirely incorporated herein by reference.

TECHNICAL FIELD

The present invention is generally related to personal communications and, more particularly, is related to presence and availability status.

BACKGROUND OF THE INVENTION

Presence and availability are terms used to describe a present ability of an individual to communicate. Presence is an ability of an individual to communicate in real time, and availability is an individual's willingness to communicate in real time. In communications, it is advantageous to know whether a potential recipient of a communication message is present and available, i.e., available to receive and respond to the message before initiating the transmission of the message. By making the presence and availability of individual users known before any communication is attempted, a realtime communications environment is facilitated that is more effective and less obtrusive than conventional communication mediums. Clearly, the communication message that is sent to an addressee that is known to be present and available is more likely to be received promptly than a conventional message. For example, often times, conventional telephone calls are forwarded to a person's voicemail and are never returned.

Instant messaging (IM) is one communication medium that employs presence and availability technology. An instant messaging network recognizes when a user is "present" on the network. Accordingly, the network sends notification to other users (usually members of a "buddy list") that are also logged on the network that the user is "present." Further, instant messaging lets a user display custom status messages to his "buddies" online about the user's "availability." For example, a user can specify his availability status as being "busy, not taking messages." Therefore another user on the "buddy list" that is connected to the instant messaging network will be notified that although the user is present on the network, he is not available for receiving messages.

Presence and availability information is most useful when an individual shares his or her online status with a trusted group of users. A communication message sent to someone who is readily present and available is less obtrusive, when the addressee has made himself or herself available to the communication. However, today's services mostly focus on a "pull" model for users to retrieve others' presence and availability status. Typically, a user has to log on a communication network before the user is notified about the presence and availability of other users on the network. Thus, a heretofore unaddressed need exists in the industry to address the aforementioned deficiencies and inadequacies.

SUMMARY

Preferred embodiments of the present invention provide a system and method for providing presence and availability status information of a first user (User1) to a second user (User2). The system includes a presence availability server for storing presence and availability status information of User1. The presence availability server is configured to detect a change in the presence and availability status of User1. The presence availability server also informs a notification server of a change in the presence and availability status of User1. The notification server generates a notification message for a communication device of User2. The notification message contains current presence and availability status information of User1.

The preferred embodiment of the present invention can also be viewed as providing a method for supplying presence and availability status information of User1 to User2. In this regard, one embodiment of such a method, among others, can be broadly summarized by the following steps: storing presence and availability status of User1; detecting a change in the presence and availability status of User1; generating a notification message for User2, wherein the notification message contains the current presence and availability status of User1.

Other systems, methods, features, and advantages of the present invention will be or become apparent to one with skill in the art upon examination of the following drawings and detailed description. It is intended that all such additional systems, methods, features, and advantages be included within this description and the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7 is a service flow diagram illustrating interactions for a representative embodiment of the presence availability system of FIG. 1.

DETAILED DESCRIPTION

Figure 1:
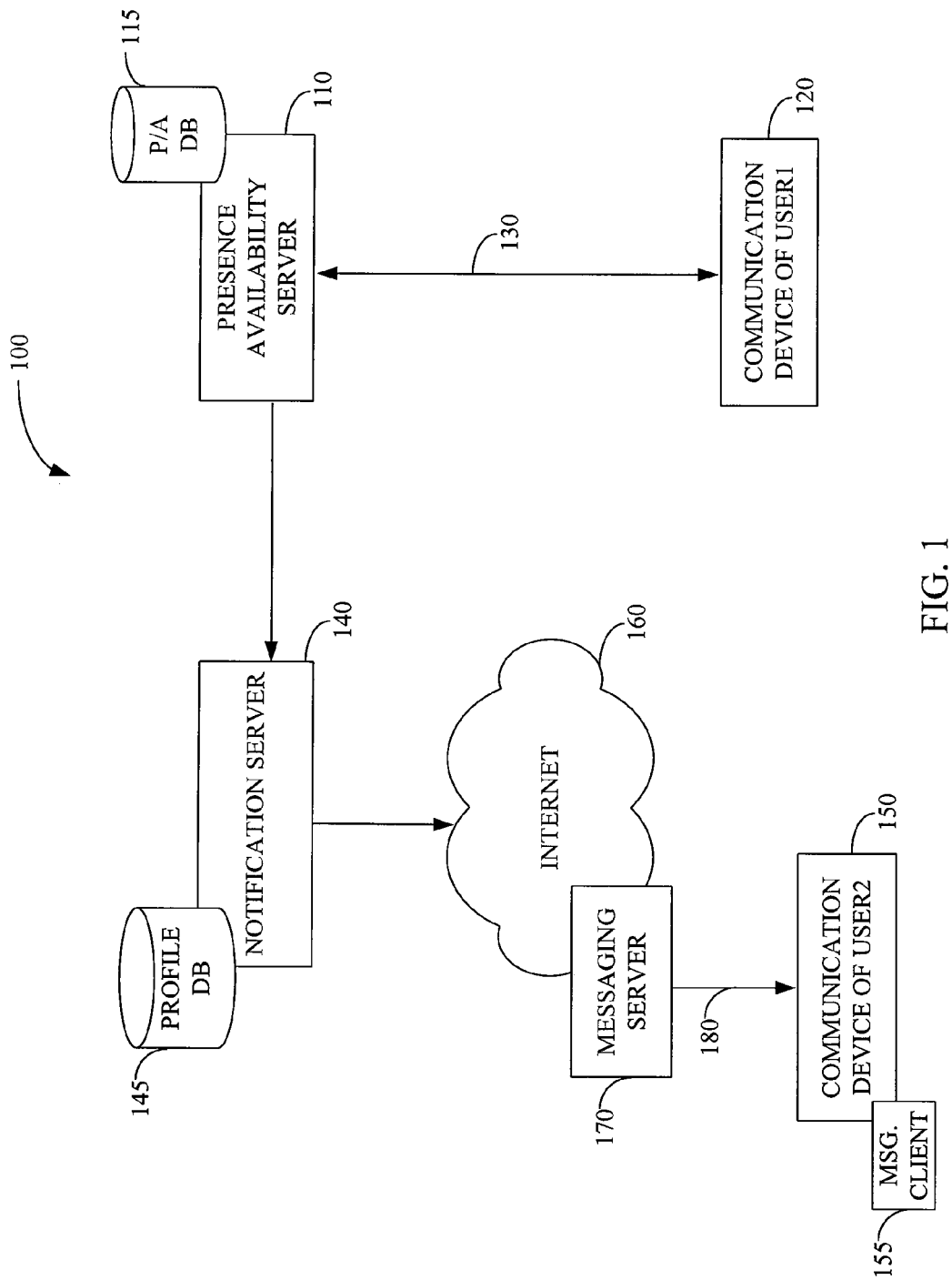
FIG. 1 is a block diagram of the presence availability notification system of one preferred embodiment of the present invention.

FIG. 1 is a block diagram of the presence availability notification system 100 of one preferred embodiment of the present invention. The presence availability notification system notifies User2 of any changes in the presence and availability status ("online status") of User1. The system 100 includes a presence availability server 110 that monitors the online status of User1 in regard to a communication device of User1 120. The communication device 120 includes, among others, any device capable of relaying the presence and availability status of User1, so that the presence and availability status of User1 can be made known to others. The communication device 120 could be, among others, a computer, a PSTN telephone, a mobile telephone, a pager, a personal digital assistant, etc. The communication device 120 may have a client program installed on the device to enable particular communication technologies, such as email, instant messaging, etc.

The presence availability server 110 maintains current presence and availability data of User1 as the presence availability server receives updates from the communication device 120. The presence availability server 110 stores presence and availability data for User1 in a presence availability database 115. The presence availability database 115 is located on the presence availability server 110. Alternatively, in other embodiments, the presence availability database 115 could be in communication with and located separately from the presence availability server 110. The communication device of User1 120 notifies the presence availability server 110 of a change in the presence and availability status of User1. The communication device of User1 communicates with the presence availability server 110 via a communication network 130. The communication network 130 could be a PSTN telephone network, the Internet, or any other network supporting communication technologies.

The presence availability notification system 100 also includes a notification server 140 that receives update messages from the presence availability server 110 concerning a change in the presence and availability status of User1. The notification server 140 then sends a notification message to the communication device 150 of User2 to notify User2 of a change in the online status of User1. The User2 communication device 150 includes any device that User2 can receive a notification message with, such as a PSTN phone, an email client, an instant messaging client, etc.

The notification server 140 contains a profile database 145. The profile database 145 contains profiles of users of the notification server 140, such as User1 and User2. Alternatively, the profile database 145 could be stored separately from the notification server 140 on another server that is in communication with the notification server 140. The notification server 140 preferably generates and transmits notification messages for receipt by the communication device 150 of User2 by using the Internet 160. In other embodiments, however, any type of communication network, besides the Internet 160, could be used.

Particularly, in one implementation, the notification server 140 sends a notification message to a messaging server 170 that is connected to the Internet 160. The messaging server 170 then forwards the notification message to the communication device 150 of User2 via a communication network 180. The messaging server 170 supports a communication technology, such as email, instant messaging, voiceXML, WAP, etc. The communication network 180 could be a PSTN telephone network, the Internet, or any other network supporting the communication technology of the messaging server 170. For example, if the messaging server 170 is an instant messaging server 170, then the communication network 180 could be the Internet, for example. Correspondingly, if the messaging server is a voiceXML server, then the communication network 180 could be a PSTN network.

The overall operation of the presence availability notification system 100 (or method 200) will be described with reference to FIG. 2, which depicts the functionality of a preferred implementation of the presence availability notification system 100. It should be noted that, in some alternative implementations, the functions noted in the various steps may occur out of the order depicted in the figure. For example, two steps shown in succession in the figures may, in fact, be executed substantially concurrently or the steps may be executed in reverse order depending upon the functionality involved, as would be understood by one with reasonable skills in the art.

Figure 2:
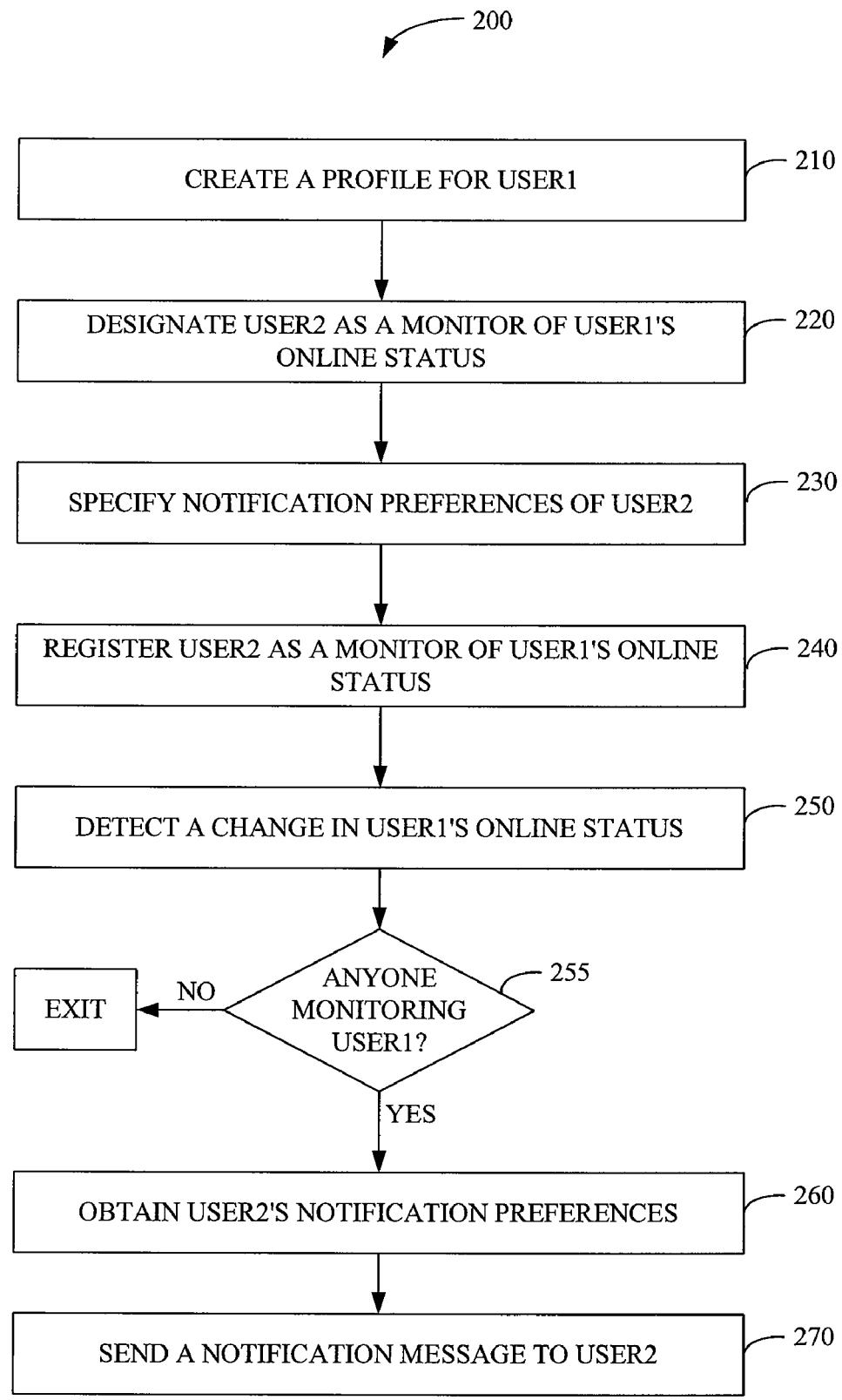
FIG. 2 is a flowchart illustrating the functionality of the presence availability system of FIG. 1.

FIG. 2 is a flowchart depicting a representative embodiment of a method 200 for notifying User2 of the presence and availability (online) status of User1. In block 210, a profile for User1 is created and stored in a profile database 145. The creation of the profile and the entering of user information for User1 may be facilitated by the use of web page and forms contained therein. In the profile of User1, User1 specifies a userID and a password. The userID and password are needed by User1 to access his profile and to update his profile information. In block 220, User1 designates individuals that he or she wants to monitor his or her online status. In this particular embodiment of the invention, User1 gives out his userID to User2. In other embodiments of the inventions, User1 could also be required to give out his or her password to User2, so that User1 is assured that only authorized persons are monitoring his or her online status.

In block 230, User2 specifies notification preferences. Again, the entering of information for User2 may be facilitated by the use of web pages. Notification preferences are the necessary contact information for delivering a notification message to User2. The notification preferences may include the email address of User2, phone number, WAP address, instant messaging address, etc. User2 may have more than one contact address specified, so that User2 can receive more than one notification message for a presence and availability status change. Typically, the notification preferences are included in a profile for User2 that is created and stored in the profile database 145. Additionally in the profile, User2 specifies a userID and password. The userID and password are needed by User2 to access his profile and to update his profile information.

In block 240, User2 registers to monitor the presence and availability status of User1. To do so, User2 specifies the userID of User1 in the profile of User2. The profile of User2 is stored in the profile database 145. Additionally, the presence availability server 110 registers that the online status of User1 is being monitored. To initiate the sending of a notification message, a change occurs in the presence and availability status of User1. For instance, if User1 terminated an instant messaging session, his or her online status changes from being "present" for instant messaging communications to being "not present." Therefore, a notification message will be sent to notify User2 of this change in the online status of User1. The current presence and availability data of User1 are maintained in a presence availability database 115 located in a presence availability server 110.

The presence availability server 110 detects the change in the presence and availability status of User1, as depicted in block 250. For instance, the communication device 120 of User1 may inform the presence availability server 110 of a change in the online status of User1. Alternatively, the presence availability server 110 could poll the communication device 120 to determine the online status of User1. In step 255, the presence availability server 110 determines from the presence availability database 115 that User1 is being monitored by at least one other user, so the presence availability server 110 informs the notification server 140 of the change in the presence and availability status of User1. Otherwise, the presence availability server 110 would not notify the notification server 140 of status changes for User1. After a change, the notification server 140 retrieves from the profile database 145 the notification preferences from the profiles of users who have the userID of User1 in their profile.

Therefore, the profile of User2 is retrieved by the notification server 140, since User2 is monitoring the online status of User1 and has the userID of User1 in his or her profile. From the profile of User2, the notification server obtains the notification preferences of User2, as depicted in block 260. The notification preferences specify the manner for delivering a notification message to User2. For example, the notification preferences may specify that a notification message is to be delivered at the email address of User2. Accordingly in block 270, a notification message detailing the presence and availability status change of User1 is sent to User2 in conformity with the notification preferences of User2. In the notification message, the presence and availability status of User2 is provided by the presence availability server.

In an alternative representative implementation of the present invention, User1 designates in his profile the users that he or she wants notified about the changes in his or her online status. Then after the notification server 140 is informed about a change in the online status of User1, the notification server 140 sends notification messages to the users designated in the profile of User1. The notification messages are delivered according to the notification preferences in the various profiles designated in the profile of User1.

In another embodiment, User1 designates in the presence availability database 115 the users that User1 wants notified about changes in the online status of User1. Accordingly, the presence availability server 110 notifies the notification server of a change in the presence and availability status of User1. The presence availability server 110 also instructs the notification server 140 on which individuals to send notifications to, since this information is stored in the presence availability database 115. The notification messages are delivered according to the notification preferences in the individual's profile in the profile database 145.

It should also be noted that the functions provided by the presence availability server & presence availability database and the notification server & profile database do not have to be provided by separate network devices. The respective functions could be performed by a single server & database.

Figure 3:
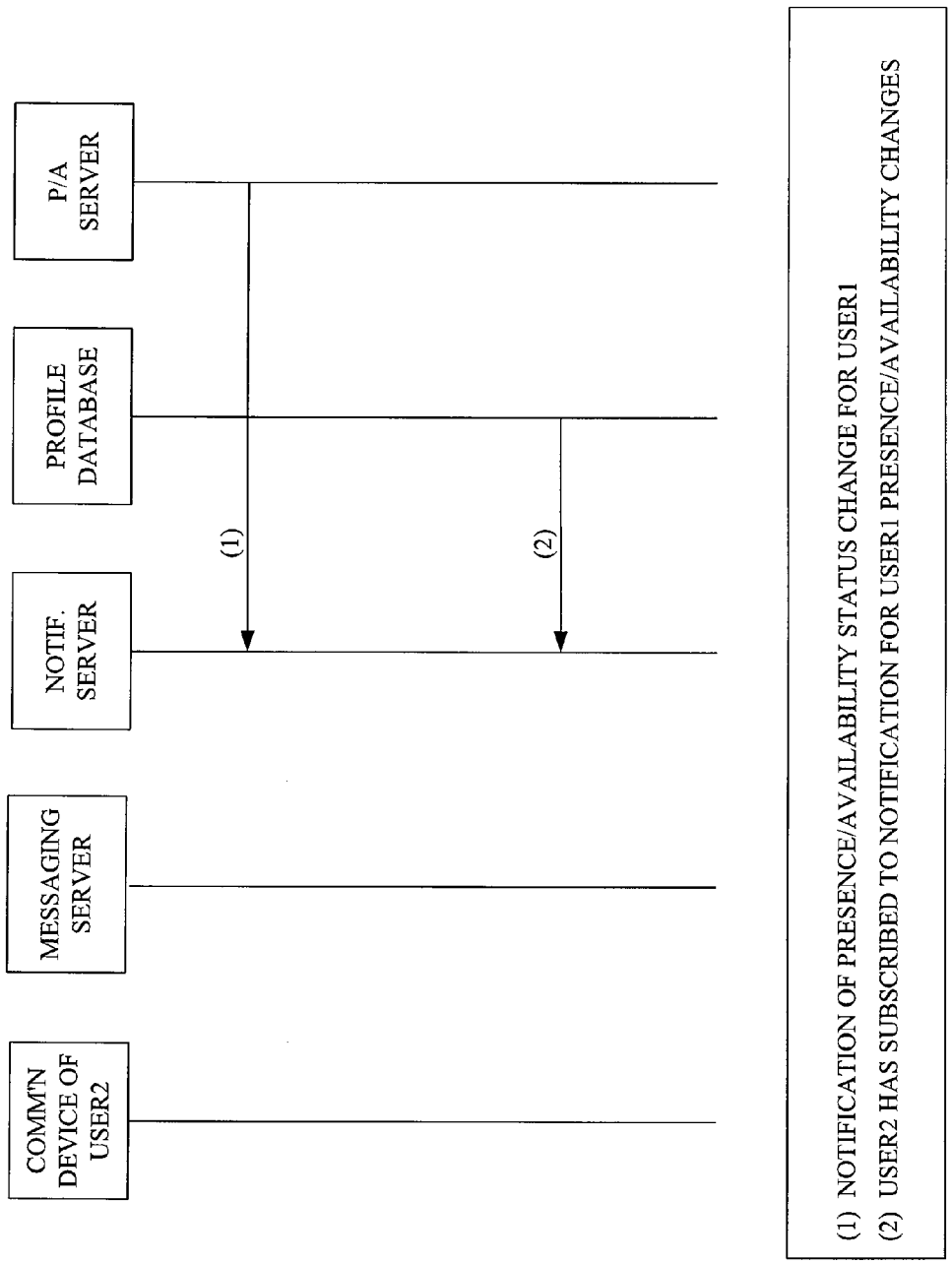
FIG. 3 is a service flow diagram illustrating interactions for a representative embodiment of the presence availability system of FIG. 1.

FIG. 3 is a service flow diagram for a representative implementation of one preferred embodiment of the present invention. FIG. 3 depicts certain interactions between the notification server 140 & profile database 145 and the presence availability server 110 & presence availability database 115. Particularly, responsive to detecting a change in the presence and availability status of User1 and an indication of monitoring by another user, the presence availability server informs the notification server about the change in the presence and availability status of User1. In this embodiment of the invention, User1 has registered User2 in the profile database 145 as a monitor of the presence and availability status of User1. In FIG. 3, once the notification server 140 is informed of a status change in the presence and availability status of User1, the notification server 140 inspects the profile database 145 and determines the user(s), such as User2, that are registered to monitor the presence and availability status of User1.

Figure 4:
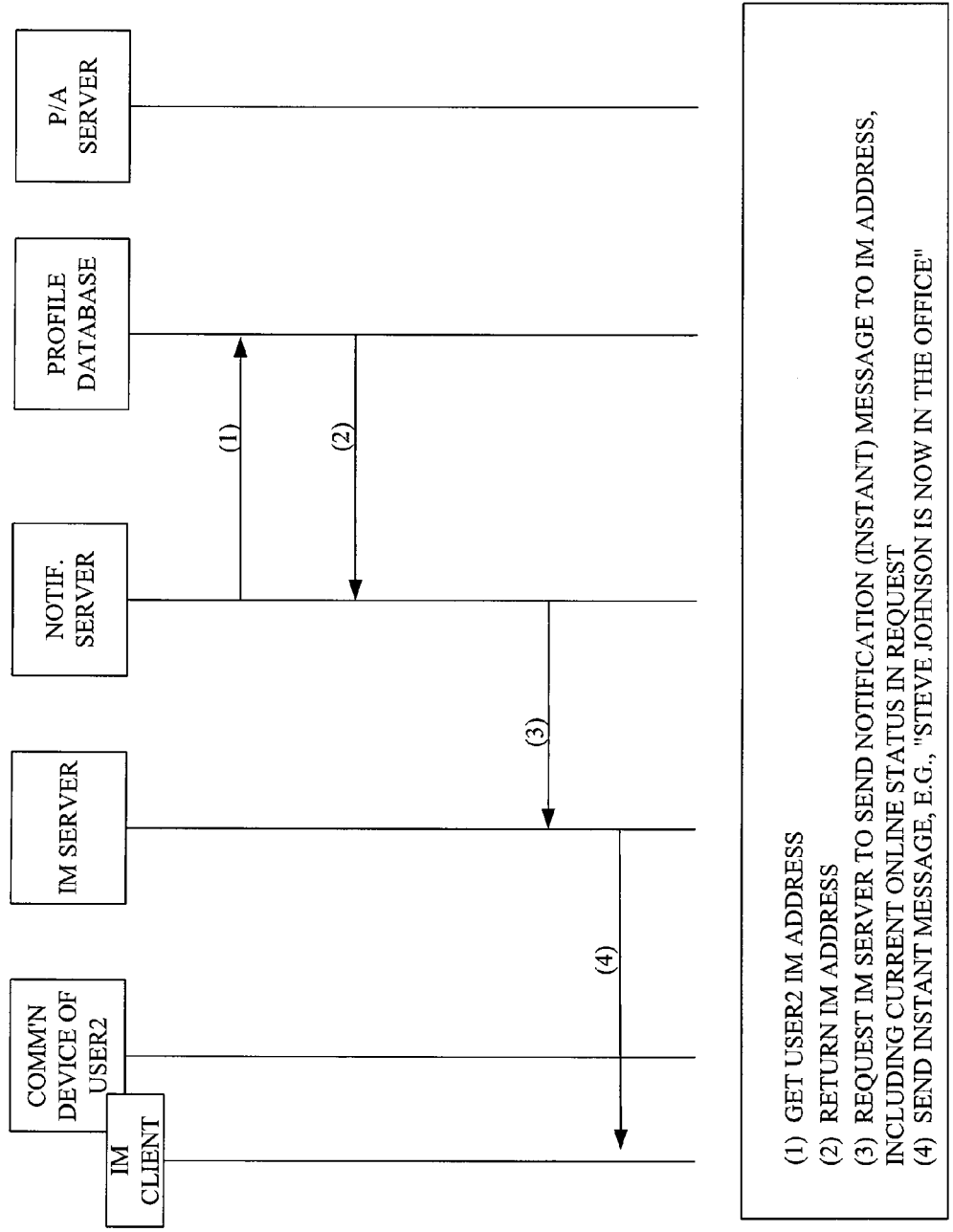
FIG. 4 is a service flow diagram illustrating interactions for a representative embodiment of the presence availability system of FIG. 1.

FIG. 4 is a service flow diagram for a representative implementation of one preferred embodiment of the invention for transmitting notification messages using instant messaging technology. FIG. 4 depicts the interactions between the notification server 140 & profile database 145 and the communication device 150 of User2, after a status change has been detected, as previously shown in FIG. 3. Here, the communication device 150 of User2 contains an instant messaging client 155. The instant messaging client 155 could be installed on a computer, a personal digital assistant (PDA), or any other device capable of providing instant messaging communications. In FIG. 4, the first action shown is the retrieval of the notification preferences specified in the profile of User2 from the profile database 145. From the notification preferences, the instant messaging address of User2 is obtained. The profile database 145 then transmits the instant messaging address of User2 to the notification server 140.

With the instant messaging address of User2, the notification server 140 requests that an instant message be sent from a messaging server 170 to the instant messaging address of User2. In this particular embodiment, the messaging server 170 is an instant messaging server. In the request to the instant messaging server 170, the notification server 140 specifies the content of the instant message, which is to include the updated online status of User1. Lastly in FIG. 4, the instant messaging server 170 transmits an instant message (notification message) to the instant messaging client 155 of User2, e.g., "Steve Johnson is now in the office." Note, the instant messaging address of User2 is the address of the instant messaging client 155 on the communication device 150 of User2.

Figure 5:
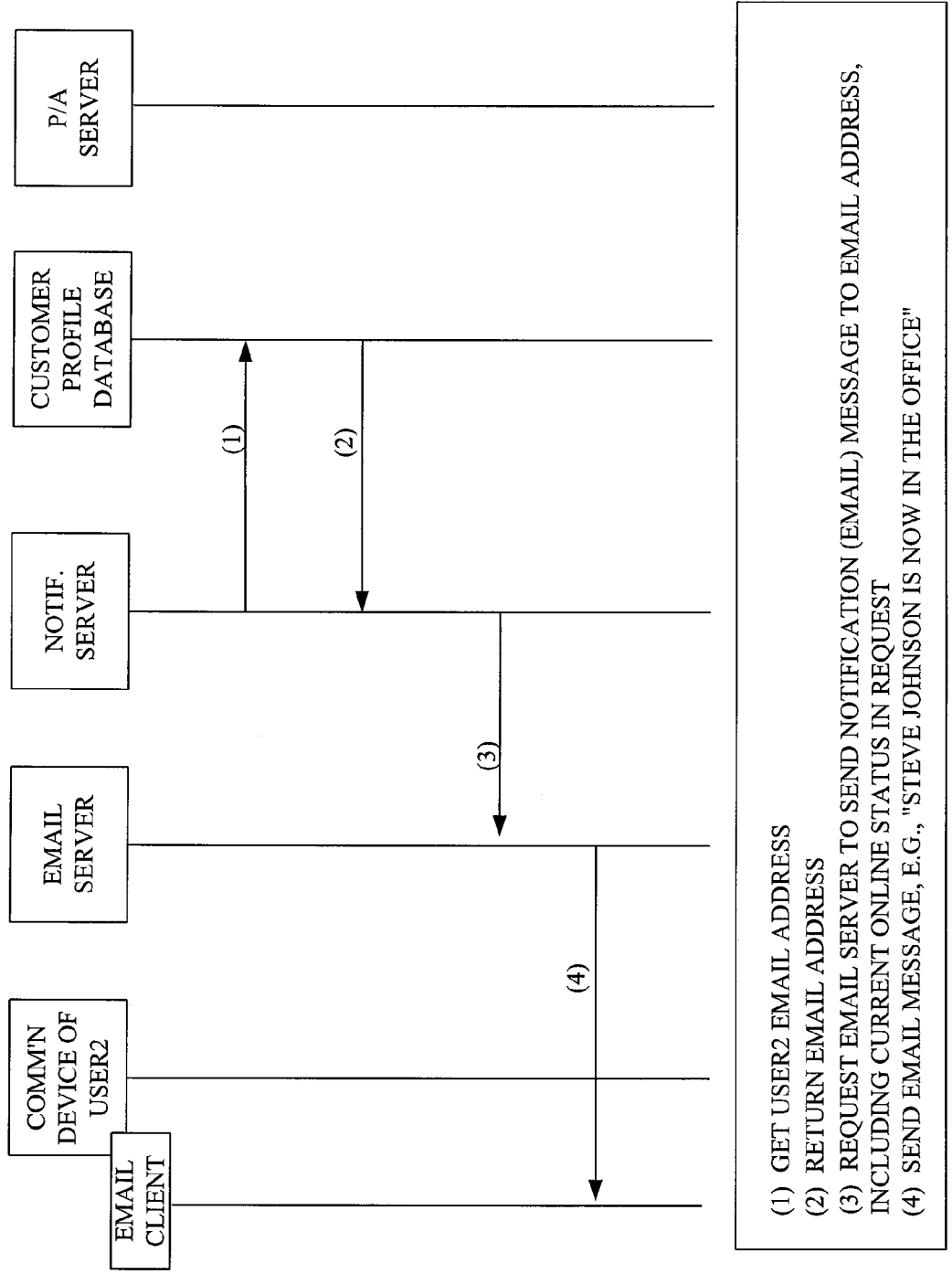
FIG. 5 is a service flow diagram illustrating interactions for a representative embodiment of the presence availability system of FIG. 1.

In another representative implementation of one preferred embodiment of the invention, FIG. 5 depicts a service flow diagram for an embodiment of the invention for transmitting notification messages using email technology. FIG. 5 shows the interactions between the notification server 140 & profile database 145 and the communication device 150 of User2, after a status change has been detected, as previously shown in FIG. 3. Here, the communication device 150 of User2 contains an email client program 155. The email client 155 could be installed on a computer connected to the Internet or on personal digital assistant (PDA) or any other device capable of providing email communications.

In FIG. 5, the first action shown is the retrieval of the notification preferences specified in the profile of User2 from the profile database 145. From the notification preferences, the email address of User2 is obtained. The profile database 145 then transmits the email address of User2 to the notification server 140. With the email address, the notification server 140 requests that an email message be sent from the messaging server 170 to the email address of User2. In this particular embodiment, the messaging server 170 is an email server. In the request to the email server 170, the notification server 140 specifies the content of the email message that is to include the new presence and availability status of User1. Lastly, the email (notification) message is transmitted from the email server 170 to the email client 155 of User2. The email address of User2 is the address of the email client 155 on the communication device 150 of User2.

Figure 6:
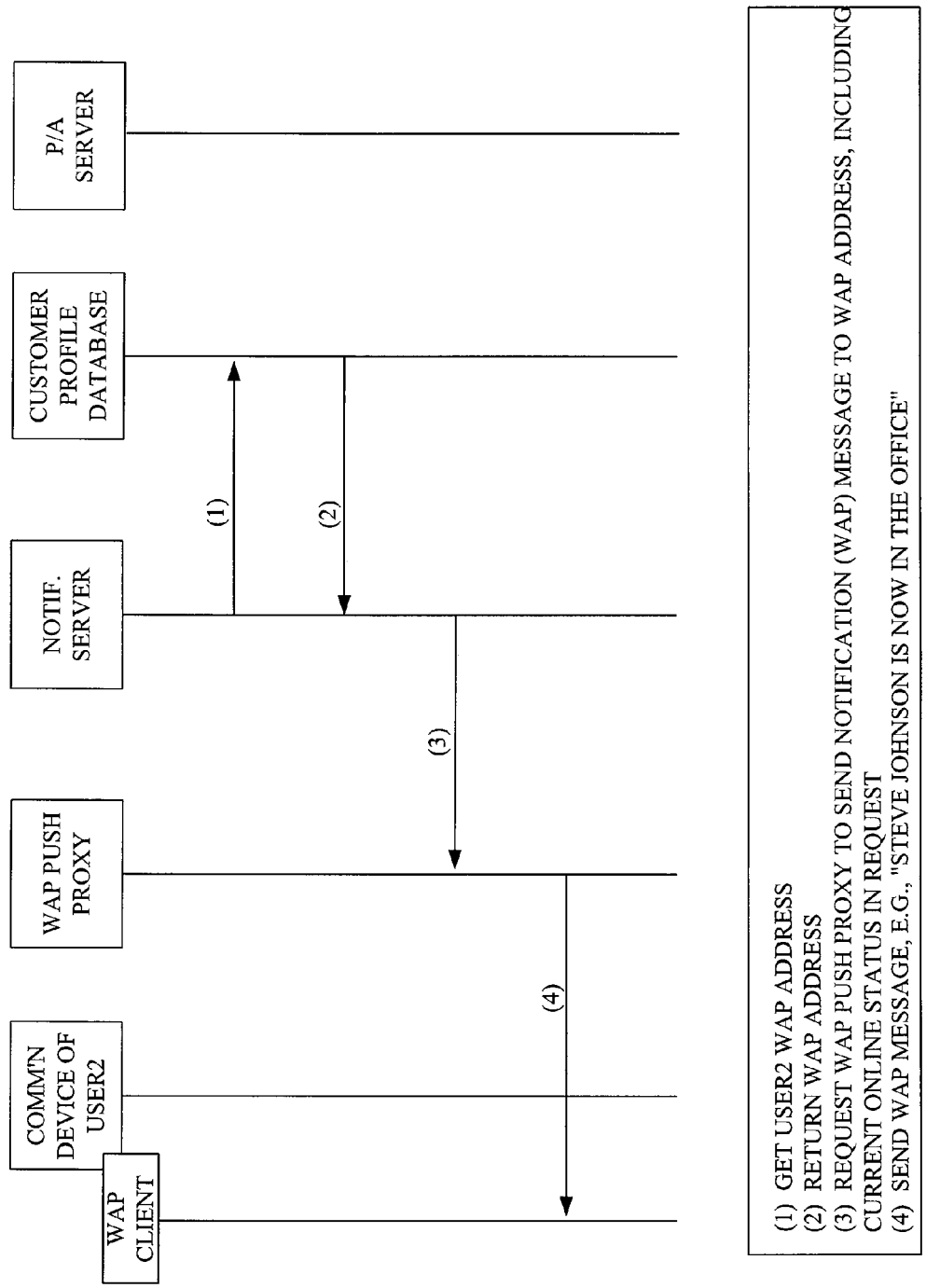
FIG. 6 is a service flow diagram illustrating interactions for a representative embodiment of the presence availability system of FIG. 1.

FIG. 6 represents the service flow diagram for another implementation of one preferred embodiment of the present invention using wireless application protocol (WAP) push technology. Particularly, FIG. 6 depicts the interactions between the notification server 140 & profile database 145 and the communication device 150 of User2, after a status change has been detected, as previously shown in FIG. 3. Here, the communication device 150 of User2 contains a WAP client. The WAP client could be installed on a mobile phone, a pager, a personal digital assistant (PDA), or any other device capable of providing WAP communications.

In FIG. 6, the first action shown is the retrieval of the notification preferences specified in the profile of User2 from the profile database. From the notification preferences, the WAP of User2 address is obtained. The profile database 145 then transmits the WAIP address of User2 to the notification server 140. With the WAP address of User2, the notification server 140 sends a notification message to the messaging server 170. In this particular embodiment, the message transmitted by the notification server 140 is encoded in wireless markup language (WML), and the messaging server 170 is a WAP push proxy. After the notification message is received at the WAP push proxy 170, the notification message is sent (or "pushed") to the communication device 150 of User2. The WAIP address is the address for the WAP client 155 on the communication device 150 of User2.

In an alternative implementation, FIG. 7 is a service flow diagram for another preferred embodiment of the invention for transmitting notification messages using voiceXML technology. VoiceXML is an application of the Extensible Markup Language (XML) which, when combined with voice recognition technology, enables interactive access to the Internet through a telephone or a voice-driven browser. FIG. 7 depicts the interactions between the notification server 140 & profile database 145 and the communication device 150 of User2, after a status change has been detected, as previously shown in FIG. 3. Here, the communication device 150 of User2 is a PSTN telephone or answering machine.

In FIG. 7, the first action shown is the retrieval of the notification preferences specified in the profile of User2 from the profile database 145. From the notification preferences, the telephone number of User2 is obtained. The profiles database 145 then transmits the telephone number of User2 to the notification server 140. Next, the notification server 140 sends a notification message in voiceXML language to a messaging server 170. In this particular embodiment, the messaging server 170 is a voiceXML gateway.

The notification message includes the new presence and availability status of User1. The voiceXML gateway 170 receives the notification message and initiates a telephone call to the telephone number of User2. Upon an answer by the communication device 150 of User2, the voiceXML gateway 170 converts the notification message in voiceXML to a voice notification message that is delivered to the communication device 150 of User2 over a PSTN telephone network.

Note, as long as the presence availability server 110 has a network interface and the number of users it has to support are small, a small workstation could operate as a presence availability server 110. More often, though, the presence availability server 110 will be a higher end platform, e.g. a Sun Microsystems Netra. The presence availability server 110 has interfaces to all of the types of devices it supports. Over these interfaces, the presence and availability status information of User1 is communicated to the presence availability server. For most devices a TCP/IP interface is sufficient. For some device types, a wireless modem may be required. Along with the device interfaces, the presence availability server may contain a database package to store the presence and availability status information in (e.g. Oracle, Access, etc.), and another interface to allow the querying of a user's presence and availability status. This second interface may be available over TCP/IP and preferably is in the form of a simple application program interface (API) or a servlet.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, other messaging technologies such as short message service (SMS) or fax messaging could be used to support the delivery of the notification messages. All such modifications and variations are intended to be included herein within the scope of this disclosure and the present invention and protected by the following claims.

Therefore, having thus described the invention, at least the following is claimed:

1. A system for providing presence and availability status information of a first user to a second user, comprising:
   a notification server configured to generate an email notification message for the second user, wherein the first user designates a group of individuals, including the second user, that are eligible to receive presence and availability status of the first user in email notification messages, the email notification message containing current presence status of the first user, wherein the notification server is to be notified of a change in the presence status of the first user with respect to instant messaging communications and the notification server is configured to send the email notification message to the second user responsive to the change being detected in the presence status of the first user and not based upon an online status of the second user, wherein the second user elects to receive presence and availability status of the first user by previously registering with the notification server and providing verification that the first user has authorized the second user to monitor the presence status of the first user.

2. The system of claim 1, further comprising:
   a presence availability server for storing presence information of the first user for instant messaging communications, wherein the presence availability server is configured to detect a change in the presence status of the first user.

3. The system of claim 2, wherein the profile database stores a profile of the first user, wherein the profile of the first user designates the second user as a monitor of the presence and availability status of the first user.

4. The system of claim 2, wherein the notification preferences include an email address for the second user.

5. The system of claim 1, further comprising:
   a profile database coupled to the notification server, the profile database storing a profile of the second user, wherein the profile of the second user contains notification preferences.

6. The system of claim 1, further comprising:
   an email messaging server communicating with the notification server, wherein:
   the notification server sends a notification message to an email messaging server; and
   the email messaging server forwards the notification message to the communication device of the second user.

7. A method for providing presence and availability status information, comprising:
   designating a group of individuals, including a second user, that are eligible to receive a presence status of a first user in email notification messages; and
   after a change in the presence status of the first user, sending an email notification message to the second user, wherein the notification message contains the current presence status of the first user for instant messaging communications and the email notification message is sent to the second user responsive to the change being detected in the presence status of the first user and not based upon an online status of the second user, wherein the second user elected to receive presence and availability status of the first status by previously registering with a notification server and providing verification that the first user has authorized the second user to monitor the presence status of the first user.

8. The method of claim 7, further comprising:
storing a profile of the second user, wherein the profile of the second user contains notification preferences.

9. The method of claim 8, wherein the notification preferences include an email address for the second user.

10. The method of claim 7, further comprising:
storing a profile of the first user, wherein the profile of first user designates the second user as a monitor of the presence status of the first user.

11. The method of claim 7, further comprising:
storing a profile of the first user, wherein:
the profile of the first user contains a userID of the first user; and
the profile of the second user contains the userID of the first user.

12. The method of claim 7, further comprising:
providing the presence status of the first user.

13. The method of claim 7, further comprising:
determining that the presence status of the first user is being monitored by the second user.

14. A non-transitory computer readable medium having executable instructions to perform:
designating a group of individuals, including a second user, that are eligible to receive a presence status of a first user in email notification messages; and
after a change in the presence status of the first user, sending an email notification message to the second user, wherein the notification message contains the current presence status of the first user for instant messaging communications and the email notification message is sent to the second user responsive to the change being detected in the presence status of the first user and not based upon an online status of the second user, wherein the second user elected to receive presence and availability status of the first status by previously registering with a notification server and providing verification that the first user has authorized the second user to monitor the presence status of the first user.

15. The non-transitory computer readable medium of claim 14, further comprising:
storing a profile of the second user, wherein the profile of the second user contains notification preferences.

16. The non-transitory computer readable medium of claim 15, wherein the notification preferences include an email address for the second user.

17. The non-transitory computer readable medium of claim 14, further comprising:
storing a profile of the first user, wherein the profile of the first user designates the second user as a monitor of the presence status of the first user.

18. The non-transitory computer readable medium of claim 14, further comprising:
storing a profile of the first user, wherein:
the profile of the first user contains a userID of the first user; and
the profile of the second user contains the userID of the first user.

19. The non-transitory computer readable medium of claim 14, further comprising:
providing the presence status of the first user.

20. The non-transitory computer readable medium of claim 14, further comprising:
determining that the presence status of the first user is being monitored by the second user.

\* \* \* \* \*